US009494106B2

(12) United States Patent
Bischofberger

(10) Patent No.: US 9,494,106 B2
(45) Date of Patent: Nov. 15, 2016

(54) PISTON FOR AN INTERNAL COMBUSTION ENGINE

(71) Applicant: MAHLE International GmbH, Stuttgart (DE)

(72) Inventor: Ulrich Bischofberger, Esslingen (DE)

(73) Assignee: MAHLE International GmbH, Stuttgart (DE)

( * ) Notice: Subject to any disclaimer, the term of this patent is extended or adjusted under 35 U.S.C. 154(b) by 66 days.

(21) Appl. No.: 14/398,784

(22) PCT Filed: May 3, 2013

(86) PCT No.: PCT/DE2013/000239
§ 371 (c)(1),
(2) Date: Nov. 4, 2014

(87) PCT Pub. No.: WO2013/167103
PCT Pub. Date: Nov. 14, 2013

(65) Prior Publication Data

US 2015/0128892 A1 May 14, 2015

(30) Foreign Application Priority Data

May 5, 2012 (DE) ........................ 10 2012 008 945

(51) Int. Cl.
*F02F 3/00* (2006.01)
*F02F 3/20* (2006.01)
(Continued)

(52) U.S. Cl.
CPC .. *F02F 3/20* (2013.01); *F01P 3/10* (2013.01); *F02F 3/18* (2013.01); *F02F 3/26* (2013.01);
(Continued)

(58) Field of Classification Search
CPC ................. F05C 2201/021; F05C 2201/0448; F02F 3/22; F02F 3/00; F02B 3/06
USPC ........................................................ 123/193.6
See application file for complete search history.

(56) References Cited

U.S. PATENT DOCUMENTS 1,678,957 A 7/1928 Philipp
1,841,796 A 1/1932 Edwards
(Continued)

FOREIGN PATENT DOCUMENTS

DE 726 685 C 10/1942
DE 762 820 C 11/1952
(Continued)

OTHER PUBLICATIONS

International Search Report of PCT/DE2013/000239, mailed Dec. 18, 2013.
(Continued)

*Primary Examiner* — Lindsay Low
*Assistant Examiner* — Charles Brauch
(74) *Attorney, Agent, or Firm* — Collard & Roe, P.C.

(57) ABSTRACT

The invention relates to a piston for an internal combustion engine, comprising a piston head and a piston skirt, the piston head having a peripheral annular part and in the region of the annular part, a peripheral cooling channel. The piston skirt comprises piston bores provided with hub bores, which are arranged over the hub connections on the underside of the piston head. The piston hubs are interconnected over the running surfaces. According to the invention, the wall of the cooling channel which extends in the region of the annular part comprises an inclined portion and together with the central axis of the piston (M), forms an acute angle (a). At least one bore which is closed towards the outside is arranged between a running surface and a hub bore such that the at least one bore leads into the cooling channel, and that the cooling channel and the at least one bore contain a coolant in the form of a metal or a metal alloy which have a low-melting point.

10 Claims, 2 Drawing Sheets

Figure 1:
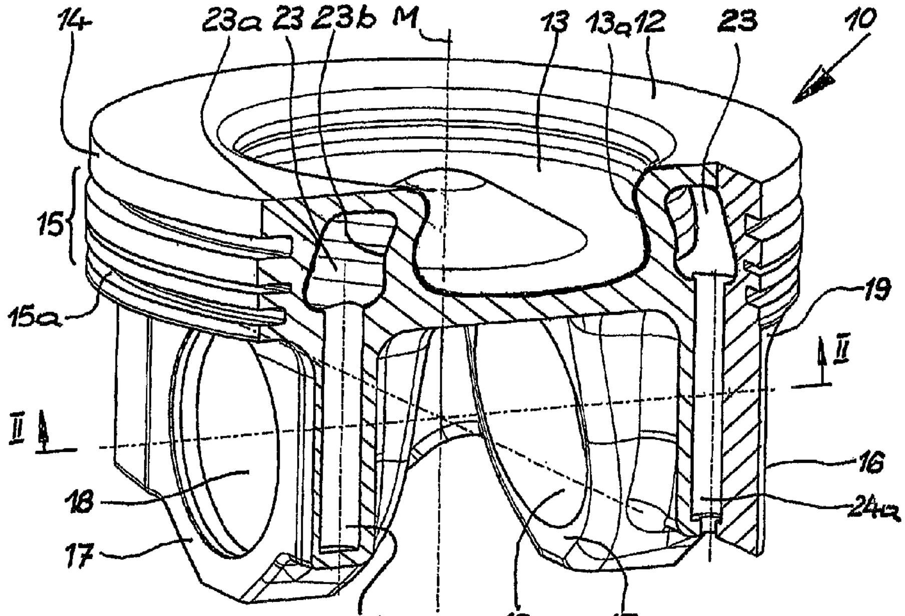

(51) Int. Cl.

| | |
|---|---|
| ***F02F 3/18*** | (2006.01) |
| ***F01P 3/10*** | (2006.01) |
| ***F02F 3/26*** | (2006.01) |
| *F02F 3/22* | (2006.01) |
| *F02B 3/06* | (2006.01) |

(52) U.S. Cl.

CPC .. *F02B 3/06* (2013.01); *F02F 3/00* (2013.01); *F02F 3/22* (2013.01); *F05C 2201/021* (2013.01); *F05C 2201/0448* (2013.01)

(56) References Cited

U.S. PATENT DOCUMENTS

| | | | | |
|---|---|---|---|---|
| 3,545,341 | A * | 12/1970 | Fischer | F02F 3/18 123/41.16 |
| 5,266,228 | A * | 11/1993 | Hirozawa | C23F 11/182 252/389.3 |
| 6,026,777 | A * | 2/2000 | Kemnitz | F02B 23/0696 123/193.6 |
| 6,691,666 | B1 | 2/2004 | Berr et al. | |
| 8,671,905 | B2 | 3/2014 | Scharp et al. | |
| 2002/0080907 | A1* | 6/2002 | Rubbia | B64G 1/408 376/318 |
| 2005/0087153 | A1 | 4/2005 | Moon | |
| 2009/0266314 | A1* | 10/2009 | Uchiyama | F01L 3/02 123/41.16 |
| 2012/0192828 | A1 | 8/2012 | Schulz et al. | |

FOREIGN PATENT DOCUMENTS

| | | | |
|---|---|---|---|
| DE | 26 13 059 | A1 | 6/1977 |
| DE | 102 44 513 | A1 | 4/2004 |
| DE | 10 2009 032 941 | A1 | 1/2011 |
| FR | 2 333 962 | A1 | 7/1977 |
| JP | 2007-270813 | A | 10/2007 |
| WO | 2013/007237 | A1 | 1/2013 |

OTHER PUBLICATIONS

German Search Report in German Application No. 10 2012 008 945.7 dated Mar. 26, 2013, with an English translation of the relevant parts of same.

* cited by examiner

PISTON FOR AN INTERNAL COMBUSTION ENGINE

CROSS REFERENCE TO RELATED APPLICATIONS

This application is the National Stage of PCT/DE2013/000239 filed on May 3, 2013, which claims priority under 35 U.S.C. §119 of German Application No. 10 2012 008 945.7 file on May 5, 2012, the disclosures of which are incorporated by reference. The international application under PCT article 21(2) was not published in English.

The present invention relates to a piston for an internal combustion engine, having a piston head and a piston skirt, wherein the piston head has a circumferential ring belt and a circumferential cooling channel in the region of the ring belt, wherein the piston skirt has pin bosses provided with pin bores, which pin bosses are disposed on the underside of the piston head by way of pin boss connections, wherein the pin bosses are connected with one another by way of working surfaces.

In modern internal combustion engines, the pistons are exposed to higher and higher temperature stresses in the region of the piston crowns. This leads to significant temperature differences, in operation, between the piston head and the piston skirt. Therefore the installation play of the pistons in a cold engine is also different from the installation play in a warm engine.

The task of the present invention consists in further developing a piston of the stated type in such a manner that a more uniform temperature distribution between the piston head and the piston skirt occurs during operation.

The solution consists in that the wall of the cooling channel that runs in the region of the ring belt has an inclination and encloses an acute angle with the center piston axis, that at least one bore closed toward the outside is provided, which bore is disposed between a working surface and a pin bore, that the at least one bore opens into the cooling channel, that the cooling channel and the at least one bore contain a coolant in the form of a metal having a low melting point or a metal alloy having a low melting point.

The piston according to the invention is characterized in that the heat produced in the region of the piston crown is passed into the piston by way of the piston head and emitted by way of the comparatively large working surfaces. In this way, a more uniform heat distribution over the entire piston is achieved during operation. Furthermore, more effective cooling of the entire piston is achieved.

The inclination of the wall of the cooling channel that runs in the region of the ring belt, provided according to the invention, brings about the result that in engine operation, the coolant does not touch this region during its downward movement, to a great extent, and touches it only to a slight extent during the upward movement. In fact, the coolant is moved upward and downward in essentially linear manner. The inclination provided according to the invention therefore forms a dead angle between the coolant, which is moved during engine operation, and the wall of the cooling channel that runs in the region of the ring belt, so that the moving coolant has no or only little contact with the wall region that lies in the dead angle. As a result, overheating of the ring belt and the accompanying risk of oil carbon in the region of the ring grooves and ring lands is prevented.

If, in addition, the underside of the piston head is cooled with cooling oil, the formation of oil carbon is prevented. In total, furthermore, the cooling oil consumption is reduced.

By means of the additional heating of the region between pin boss and piston skirt, additional thermal expansion of the piston skirt is brought about, and thereby the hot play between piston and cylinder is reduced. This is particularly advantageous if a crankcase composed of a light metal material, for example an aluminum-based material, having a higher heat expansion coefficient than that of the piston material, is used.

Advantageous further developments are evident from the dependent claims.

The angle that the wall of the cooling channel that runs in the region of the ring belt encloses with the center piston axis preferably amounts to not more than 10°, in order to prevent excessive narrowing of the cooling channel and an accompanying reduction in the cooling output. For the same reason, the inclination of this wall preferably begins at the level of the upper edge of the lowermost ring groove of the ring belt.

If a combustion bowl is provided, it is advantageous if the wall of the cooling channel that runs in the region of the combustion bowl runs parallel to the contour of the wall of the combustion bowl, in order to optimize the heat transfer between the combustion bowl and the coolant accommodated in the cooling channel.

Metals having a low melting point, which are suitable for use as coolants, are, in particular, sodium or potassium. In particular, Galinstan® alloys, bismuth alloys having a low melting point, and sodium-potassium alloys can be used as metal alloys having a low melting point.

Alloy systems composed of gallium, indium, and tin, which are liquid at room temperature, are called Galinstan® alloys. These alloys consist of 65 wt.-% to 95 wt.-% gallium, 5 wt.-% to 26 wt.-% indium, and 0 wt.-% to 16 wt.-% tin. Preferred alloys are those, for example, having 68 wt.-% to 69 wt.-% gallium, 21 wt.-% to 22 wt.-% indium, and 9.5 wt.-% to 10.5 wt.-% tin (melting point −19° C.), 62 wt.-% gallium, 22 wt.-% indium, and 16 wt.-% tin (melting point 10.7° C.), as well as 59.6 wt.-% gallium, 26 wt.-% indium, and 14.4 wt.-% tin (ternary eutectic, melting point 11° C.)

Bismuth alloys having a low melting point are known in great numbers. These include, for example, LBE (eutectic bismuth-lead alloy, melting point 124° C.), Rose's metal (50 wt.-% bismuth, 28 wt.-% lead, and 22 wt.-% tin, melting point 98° C.), Orion metal (42 wt.-% bismuth, 42 wt.-% lead, and 16 wt.-% tin, melting point 108° C.); quick solder (52 wt.-% bismuth, 32 wt.-% lead, and 16 wt.-% tin, melting point 96° C.), d'Arcet's metal (50 wt.-% bismuth, 25 wt.-% lead, and 25 wt.-% tin), Wood's metal (50 wt.-% bismuth, 25 wt.-% lead, 12.5 wt.-% tin, and 12.5 wt.-% cadmium, melting point 71° C.), Lipowitz' metal (50 wt.-% bismuth, 27 wt.-% lead, 13 wt.-% tin, and 10 wt.-% cadmium, melting point 70° C.), Harper's metal (44 wt.-% bismuth, 25 wt.-% lead, 25 wt.-% tin, and 6 wt.-% cadmium, melting point 75° C.), Cerrolow 117 (44.7 wt.-% bismuth, 22.6 wt.-% lead, 19.1 wt.-% indium, 8.3 wt.-% tin, and 5.3 wt.-% cadmium, melting point 47° C.); Cerrolow 174 (57 wt.-% bismuth, 26 wt.-% indium, 17 wt.-% tin, melting point 78.9° C.), Field's metal (32 wt.-% bismuth, 51 wt.-% indium, 17 wt.-% tin, melting point 62° C.), and Walker's alloy (45 wt.-% bismuth, 28 wt.-% lead, 22 wt.-% tin, and 5 wt.-% antimony).

Suitable sodium-potassium alloys can contain 40 wt.-% to 90 wt.-% potassium. The eutectic alloy NaK with 78 wt.-% potassium and 22 wt.-% sodium (melting point −12.6° C.) is particularly suitable.

The coolant can additionally contain lithium and/or lithium nitride. If nitrogen is used as a protective gas during filling, it can react with the lithium to form lithium nitride and can be removed from the cooling channel in this manner.

The coolant can furthermore contain sodium oxide and/or potassium oxide, if any dry air that might be present has reacted with the coolant during filling.

Preferably, four bores are provided, which are disposed between a working surface and a pin bore, in order to achieve a particularly uniform temperature distribution in the piston.

The amount of coolant accommodated in the cooling channel or in the at least one bore depends on its heat conductivity and the degree of the desired temperature control. Preferably, the coolant has a fill height up to half the height of the cooling channel, in order to achieve the desired Shaker effect and thereby particularly effective heat distribution in the piston.

Particularly if the proportion of combustion heat that flows into the piston during engine operation is supposed to be limited, this can be controlled using the amount of coolant filled in. It has been shown that sometimes filling 3% to 10% of the cooling channel volume with the coolant suffices to ensure proper functioning of the piston.

Figure 2:
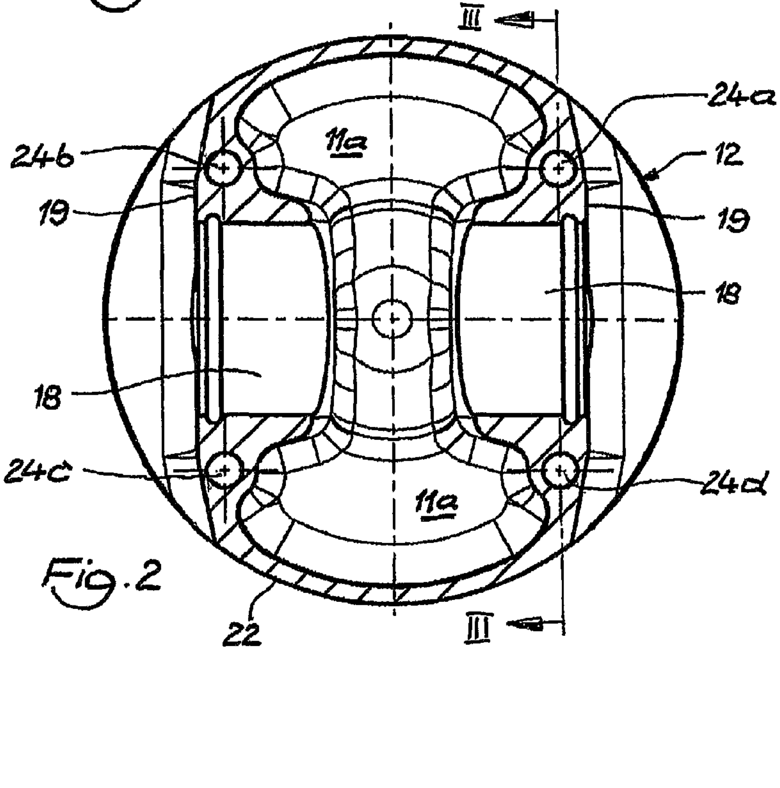
Figure 3:
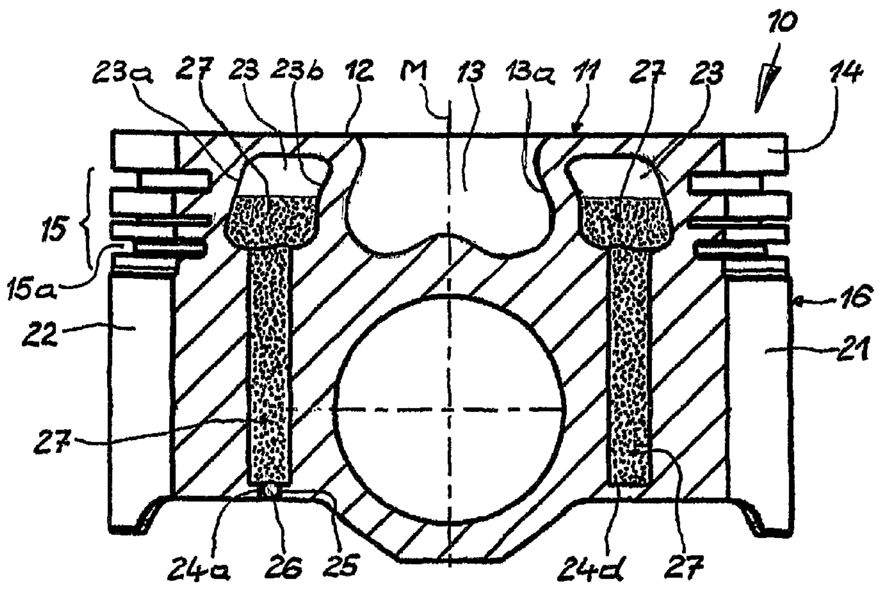
Figure 4:
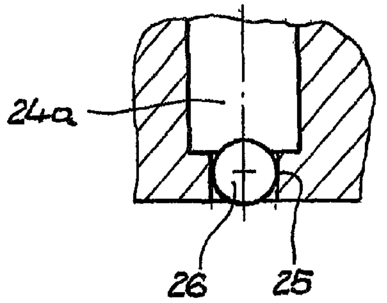
Figure 5:
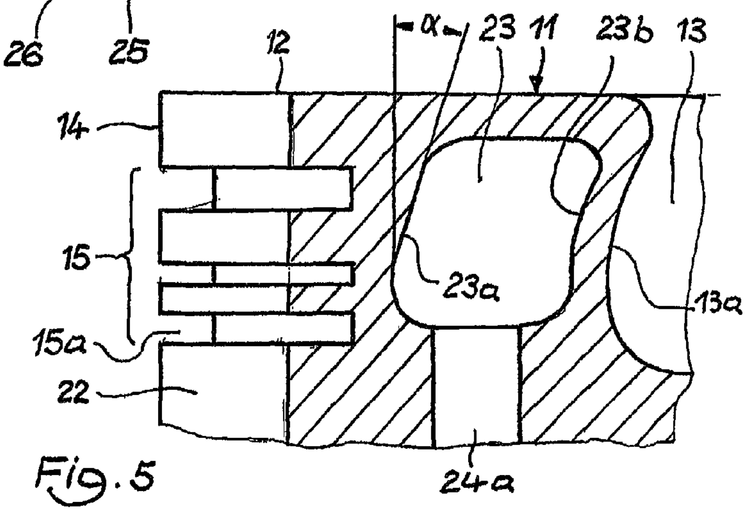

An exemplary embodiment of the present invention will be explained in greater detail below, using the attached drawings. These show, in a schematic representation, not true to scale:

FIG. 1 an exemplary embodiment of a piston according to the invention, partly in section;

FIG. 2 a section along the line II-II in FIG. 1;

FIG. 3 a section along the line III-III in FIG. 2;

FIG. 4 an enlarged partial representation of a bore according to FIG. 3, in section;

FIG. 5 an enlarged partial representation of the cooling channel according to FIG. 3, in section;

FIGS. 1 to 5 show an exemplary embodiment of a piston 10 according to the invention. The piston 10 can be a one-part or multi-part piston. The piston 10 can be produced from an iron-based material and/or from a light metal material, whereby the iron-based material is preferred.

FIGS. 1 to 3 show a one-part box piston 10 as an example. The piston 10 has a piston head 11 having a piston crown 12 having a combustion bowl 13, a circumferential top land 14, and a ring belt 15 for accommodating piston rings (now shown). A circumferential cooling channel 23 is provided at the level of the ring belt 15. The piston 10 furthermore has a piston skirt 16 having pin bosses 17 and pin bores 18 for accommodating a piston pin (not shown). The pin bosses 17 are connected with the underside 11*a* of the piston head by way of pin boss connections 19. The pin bosses 17 are connected with one another by way of working surfaces 21, 22 (see, in particular, FIG. 2).

The wall 23*a* of the cooling channel 23 that runs in the region of the ring belt 15 has an inclination and encloses an acute angle $\alpha$ of up to 10° with the center piston axis M. The inclination begins approximately in the region of the upper edge of the lowermost ring groove 15*a* of the ring belt 15, and continues to the upper end of the cooling channel 23. The wall 23*b* of the cooling channel 23 that runs in the region of the combustion bowl 13 runs parallel to the wall 13*a* of the combustion bowl 13.

In the exemplary embodiment, the piston skirt 16 has four bores 24*a*, 24*b*, 24*c*, 24*d*. The bores 24*a-d* run approximately axially and parallel to the center piston axis M in the exemplary embodiment. The bores 24*a-d* can, however, also run inclined at an angle relative to the center piston axis M. The bores 24*a-d* are disposed between a working surface 21, 22 and a pin bore 18. The bores 24*a-d* open into the cooling channel 23.

In the exemplary embodiment, the piston 10 can be cast, for example, in known manner, whereby the cooling channel 23 and the bores 24*a-d* can be introduced by means of a salt core, in known manner. It is essential that at least one bore 24*a* has an opening 25 toward the outside. According to the invention, the coolant 27, namely a metal having a low melting point or a metal alloy having a low melting point, as listed as examples above, is filled into the bore 24*a* through the opening 25. From there, the coolant 27 is distributed in the cooling channel 23 and in the further bores 24*b-d*. The opening 25 is subsequently sealed tightly, in the exemplary embodiment by means of a steel ball 26 that is pressed in. The opening 25 can also be closed off by welding on a lid or pressing on a cap, for example (not shown).

The size of the bores 24*a-d* and the fill amount of the coolant 27 are based on the size and the material of the piston 10. On average, about 10 g to 40 g coolant 27 are required per piston 10. The cooling output can be controlled by way of the amount of the coolant 27 added, taking its heat conductivity coefficient into consideration. For example, a fill level in the cooling channel 23 that corresponds to about half the height of the cooling channel 23 is suitable. In this case, the known Shaker effect can be additionally utilized for particularly effective heat distribution in the piston, during operation. For sodium as a coolant 27, with a temperature during operation of 220° C., a maximal surface temperature of the piston 10 of about 260° C. occurs at a cooling output of 350 kW/$m^2$.

In addition, the underside 11*a* of the piston head 11 can be cooled by spraying it with cooling oil.

To fill the bore 24*a*, a lance is introduced through the opening 25, and flushing by means of nitrogen or by means of another suitable inert gas or by means of dry air takes place. To introduce the coolant 27, the latter is passed through the opening 25 under protective gas (for example nitrogen or inert gas or dry air), so that the coolant 27 is accommodated in the bore 24*a* or in the cooling channel 23.

A further method for filling the bore 24*a* is characterized in that after flushing with nitrogen, inert gas or dry air, the bores 24*a-d* and the cooling channel 23 are evacuated, and the coolant 27 is introduced in a vacuum. In this way, the coolant 27 can move back and forth in the cooling channel 23 and into and out of the bores 24*a-d* more easily, because it is not hindered by protective gas that is present.

Another possibility for removing the protective gas from the cooling channel 23 and the bores 24*a-d* consists in using nitrogen or dry air (i.e. essentially a mixture of nitrogen and oxygen) as the protective gas, and adding a small amount of lithium to the coolant 27, according to experience about 1.8 mg to 2.0 mg lithium per cubic centimeter of gas space (i.e. volume of the cooling channel 23 plus volume of the bores 24*a-d*). While sodium and potassium, for example, react with oxygen, the lithium reacts with nitrogen to form lithium nitride. The protective gas is therefore almost completely bound in the coolant 27 as a solid.

The invention claimed is:

1. A piston for an internal combustion engine, comprising:

a piston head having a circumferential ring belt and a circumferential cooling channel in a region of the ring belt, a piston skirt having pin bosses provided with pin bores, which pin bosses are disposed on an underside of the piston head by way of pin boss connections, wherein the pin bosses are connected with one another by way of working surfaces, wherein a wall of the cooling channel that runs in the region of the ring belt has an inclination and encloses an acute angle (α) with a center piston axis (M), wherein exactly four bores are provided, said bores being closed toward the outside and disposed between the working surface and one of the pin bores, wherein the bores open into the cooling channel, and wherein the cooling channel and the bores contain a coolant in the form of a metal having a low melting point or a metal alloy having a low melting point.

2. The piston according to claim 1, wherein the angle (α) amounts to maximally 10°.

3. The piston according to claim 1, wherein the inclination of the wall starts at the level Of an upper edge of a lowermost ring groove of the ring belt.

4. The piston according to claim 1, wherein a combustion bowl is provided in the piston head, and wherein the wall of the cooling channel that runs into a region of the combustion bowl runs parallel to a contour of the wall of the combustion bowl.

5. The piston according to claim 1, wherein the coolant is sodium or potassium.

6. The piston according to claim 1, wherein the coolant is a metal alloy selected from the group consisting of Galinstan® alloys, bismuth alloys having a low melting point, and sodium-potassium alloys.

7. The piston according to claim 1, wherein the coolant contains lithium and/or lithium nitride.

8. The piston according to claim 1, wherein the coolant contains sodium oxides and/or potassium oxides.

9. The piston according to claim 1, wherein the coolant has a fill height up to half the height of the cooling channel.

10. The piston according to claim 1, wherein the coolant has a fill amount of 3% to 10% of the volume of the cooling channel.

* * * * *